United States Patent
Habib

(10) Patent No.: US 10,163,194 B2
(45) Date of Patent: Dec. 25, 2018

(54) METHOD OF PROCESSING AN IMAGE

(71) Applicant: Purdue Research Foundation, West Lafayette, IN (US)

(72) Inventor: Ayman F. Habib, West Lafayette, IN (US)

(73) Assignee: PURDUE RESEARCH FOUNDATION, West Lafayette, IN (US)

(*) Notice: Subject to any disclaimer, the term of this patent is extended or adjusted under 35 U.S.C. 154(b) by 0 days.

(21) Appl. No.: 15/714,481

(22) Filed: Sep. 25, 2017

(65) Prior Publication Data
US 2018/0089804 A1 Mar. 29, 2018

Related U.S. Application Data

(60) Provisional application No. 62/398,566, filed on Sep. 23, 2016.

(51) Int. Cl.
*G06K 9/00* (2006.01)
*G06T 3/60* (2006.01)
(Continued)

(52) U.S. Cl.
CPC ............... *G06T 3/60* (2013.01); *G06T 7/337* (2017.01); *G06T 7/55* (2017.01);
(Continued)

(58) Field of Classification Search
CPC .. G06T 3/60; G06T 7/55; G06T 7/337; G06T 2207/10024; G06T 2207/10036; G06T 2207/20212; G06T 2207/30188
See application file for complete search history.

(56) References Cited

U.S. PATENT DOCUMENTS

| | | | |
|---|---|---|---|
| 8,374,428 B2* | 2/2013 | Lepikhin | H04N 9/735 348/218.1 |
| 9,589,210 B1 | 3/2017 | Estrada et al. | |

(Continued)

FOREIGN PATENT DOCUMENTS

WO   2007094765   8/2007

OTHER PUBLICATIONS

Habib, Ayman, et al. "Automated ortho-rectification of UAV-based hyperspectral data over an agricultural field using frame RGB imagery." Remote Sensing 8.10 (2016): 796.*

(Continued)

*Primary Examiner* — Shefali D Goradia
(74) *Attorney, Agent, or Firm* — Purdue Research Foundation

(57) ABSTRACT

A non-transitory computer-readable medium encoded with a computer-readable program, which when executed by a processor, will cause a computer to execute a computational method, the computational method including collecting an image data, wherein the collecting the image data comprises collecting a first plurality of RGB images and a second plurality of hyperspectral images. The method further includes orthorectifying the image data to produce an RGB based orthophoto and a partially rectified hyperspectral orthophoto. The method further includes selecting tie features from each of the RGB based orthophoto and the partially rectified hyperspectral orthophoto. Lastly, the method includes registering the features of the partially rectified hyperspectral orthophoto into the tie features of the RGB based orthophoto.

22 Claims, 4 Drawing Sheets

(51) Int. Cl.
  *G06T 7/33* (2017.01)
  *G06T 7/55* (2017.01)
(52) U.S. Cl.
  CPC .............. *G06T 2207/10024* (2013.01); *G06T 2207/10036* (2013.01); *G06T 2207/20212* (2013.01); *G06T 2207/30188* (2013.01)

(56) References Cited

U.S. PATENT DOCUMENTS

| 9,797,980 | B2* | 10/2017 | Smitherman | G01C 11/02 |
| 2015/0243073 | A1 | 8/2015 | Chen | |
| 2016/0334276 | A1* | 11/2016 | Pluvinage | G01J 3/2823 |

OTHER PUBLICATIONS

Helge Aasen et al., Generating 3D hyperspectral information with lightweight UAV snapshot cameras for vegetation monitoring: From camera calibration to quality assurance, ISPRS Journal of Photogrammetry and Remote Sensing, Sep. 8, 2015, 245-259, 108, Elsevier.

Ryan Hruska et al., Radiometric and Geometric Analysis of Hyperspectral Imagery Acquired from an Unmanned Aerial Vehicle, Remote Sensing, Sep. 17, 2012, 2736-2752.

Changno Lee et al., Georegistration of Airbone Hyperspectral Image Data, IEEE Transactions on Geoscience and Remote Sensing, Jul. 7, 2001, 1347-1351, 39.

Tengfei Long et al., A Fast and Reliable Matching Method for Automated Georeferencing of Remotely-Sensed Imagery, Remote sensing, Jan. 19, 2016, 1-23.

Juan-Pablo Ramirez-Paredes et al., Low-altitude Terrestrial Spectroscopy from a Pushbroom Sensor, Journal of Field Robotics, Jul. 23, 2015, 837-852, 33, 6.

Juha Suomalainen et al., A Lightweight Hyperspectral Mapping System and Photogrammetric Processing Chain for Unmanned Aerial Vehicles, Remote sensing, Nov. 10, 2014, 11013-11030, 6.

Li Wang et al., A robust multisource image automatic registration system based on the SIFT descriptor, International Journal of Remote Sensing, Dec. 8, 2011, 3850-3869, 33:12.

* cited by examiner

METHOD OF PROCESSING AN IMAGE

CROSS-REFERENCE TO RELATED APPLICATIONS

The present U.S. Patent Application is related to and claims the priority benefit of U.S. Provisional Patent Application Ser. No. 62/398,566, filed Sep. 23, 2016, the contents of which is hereby incorporated by reference in its entirety into this disclosure.

STATEMENT OF GOVERNMENT SUPPORT

This invention was made with government support under DE-AR0000593 awarded by the Department of Energy. The government has certain rights in the invention.

BACKGROUND

This section introduces aspects that may help facilitate a better understanding of the disclosure. Accordingly, these statements are to be read in this light and are not to be understood as admissions about what is or is not prior art.

Since their emergence in the mid-1980s, mobile mapping systems (MMS) onboard terrestrial and airborne platforms have been established as the most economic and accurate methodology for collecting geospatial data to satisfy a variety of needs including precision agriculture. The MMS' ability to address the demands of such applications is boosted by recent advances in direct georeferencing and imaging technologies. Direct evaluation of mobile platforms' position and orientation using integrated global navigation satellite systems (GNSS) and inertial navigation systems (INS) is allowing for precise mapping using minimal number of ground control points (GCPs). However, in spite of these advances, MMS remains prohibitively costly for many applications and requires extensive technical expertise. In this regard, low-cost unmanned airborne vehicles (UAVs) equipped with directly georeferenced passive- and active-imaging systems are emerging as alternative mobile-mapping platforms that can suit the needs of several applications such as precision agriculture. To that end, UAV-based MMS are gaining tremendous interest from researchers in the mapping and plant-science fields to satisfy needs such as precision agriculture, high-throughput phenotyping, etc.

Precision agriculture has become an important activity for 1) optimizing crop yield given diminishing resources, 2) increasing the reliability of crop-yield prediction, and 3) reducing the agricultural impact on the environment through efficient use of fertilizers and pesticides. Technologies are also being adapted for advanced plant breeding where phenotypic data are obtained to quantify plant growth, structure, and composition at multiple scales over the growing season. Traditional phenotyping has primarily been conducted in field-based plots, which is time-consuming, labor-intensive, and includes destructive sampling.

To obtain a rich set of structure and chemistry based traits, airborne vehicle platforms are being equipped with RGB cameras and hyperspectral scanners. RGB cameras provide high geometric resolution for accurate localization and estimation of important plant traits such as height, canopy closure, and leaf structure. Hyperspectral scanners with fine spectral resolution provide useful data for the estimation of canopy nitrogen, chlorophyll content, and various narrow-band vegetation indices. Due to the volume of collected data, in general, RGB cameras implement frame arrays whereas hyperspectral scanners are most commonly based on a linear array that captures scenes while operating in a push-broom mode (i.e., the scene coverage is achieved through multiple exposures of the linear array during the platform's motion along its trajectory). However, there are no robust methods to correlate these two imagery techniques, requiring both to be obtained simultaneously, which pose a challenge since image capturing for one technique can interfere with the other technique.

There is, therefore an unmet need for a novel approach to correlate RGB and hyperspectral imagery techniques obtained from respective cameras mounted on an airborne vehicle thereby allowing independent image capturing events.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Figure 1:
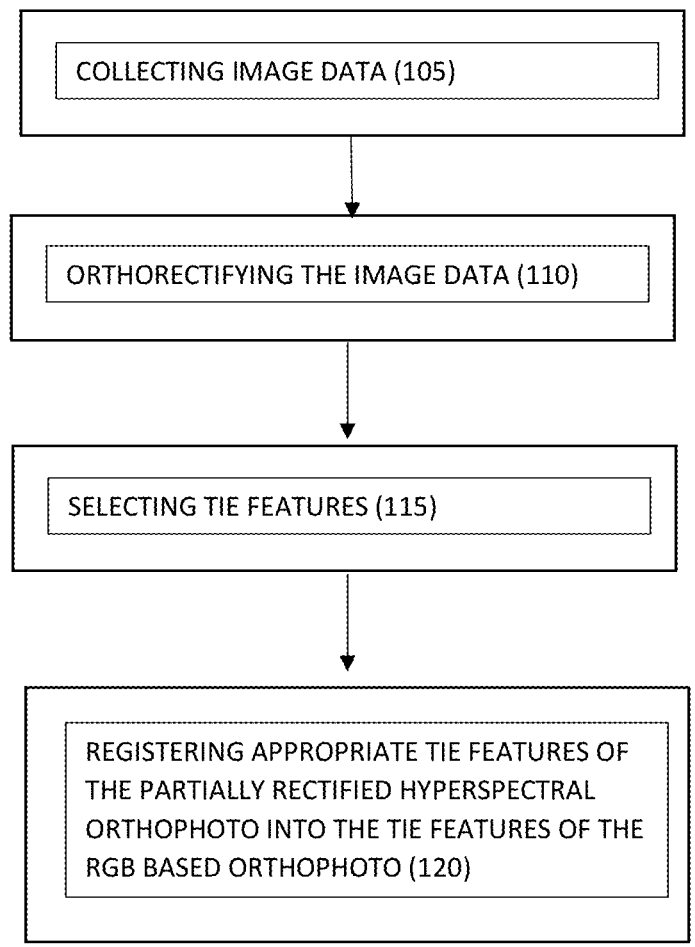
FIG. 1 is a flow-chart which illustrates a method of processing an image according to one or more embodiments.

FIG. 1 is a flow-chart which illustrates a method 100 of processing an image according to one or more embodiments. Method 100 of processing an image starts off with step 105 where image data is collected. In one or more embodiments, the image data is collected by aerial vehicle platforms and/or satellites. In at least one embodiment, the image data is collected by an unmanned aerial vehicle. In several embodiments, the image data includes a first plurality of images taken from an RGB-frame camera, and a second plurality of images taken from a hyperspectral push-broom scanner. In one or more embodiments, the image data is of an area of interest. In several embodiments, each of the aerial vehicles and/or satellites include an RGB-frame camera and a hyperspectral push-broom scanner. In some embodiments, the above cameras are triggered simultaneously to capture an array of input images.

The above cameras may be mounted wherein at least one camera is arranged to collect a top-down view of the ground image, and the remaining cameras are arranged to collect oblique or angled views of the ground image. In such embodiments, where 90 degrees defines a top-down view and 0 degrees and 180 degrees define horizontal views in opposing directions, an oblique or angled camera arrangement may be, in certain embodiments, at some degree between approximately 45 and 90 or between approximately 90 and 135 degrees. In some embodiments, cameras may be arranged at oblique or angled views of approximately 45 degrees, 60 degrees, 75 degrees, 105 degrees, 120 degrees, and/or 135 degrees. In one or more embodiments, the captured image data is stored in a database for future retrieval and development.

Method 100 of processing the image continues with step 110 where the image data is orthorectified. In several embodiments, the first plurality of images are processed by various software applications that generate a wide area digital elevation model (DEM) and orthorectified image mosaics to create an RGB based orthophoto. The second plurality of images are processed by various software applications that generate a second wide area DEM model and orthorectified image mosaics to create a partially rectified hyperspectral orthophoto. In various embodiments herein, orthorectification refers to imagery that has been corrected to remove various distortions introduced into an image by either angle of incidence or a particular point from the center of a camera/sensor, overlap, significant topological changes, processing time, optical differences at the time of capture, etc.

In one or more embodiments, georeferencing information (i.e., position and orientation) for individual scan lines of a push-broom scanner scene is obtained from a consumer-grade GNSS/INS unit for creating the partially rectified hyperspectral orthophoto. In at least one embodiment, georeferencing information, and a reasonable number of ground control points (GCPs) to derive position and orientation information of individual images of the first plurality of images are used to create a high level of geometric fidelity in the RGB based orthophoto. In at least one embodiment, a method 200 illustrated in the latter part of the present disclosure is adapted for the purposes of forming the RGB based orthophoto from the first plurality of images. In one or more embodiments, a method 300 illustrated in the latter part of the present disclosure is adapted for the purposes of forming the partially rectified hyperspectral orthophoto from the second plurality of images.

Method 100 of processing the image continues with step 115 where appropriate tie features are selected. A tie feature corresponds to a given point on the underlying terrain (or other object) that is being photographed from multiple locations. The realization of such object point in overlapping images is knows as tie—conjugate—points. In various embodiments of the present disclosure, a plurality of tie features are selected from each of the RGB based orthophoto and the partially rectified hyperspectral orthophoto, and their appropriate transformation parameter estimations are obtained. In one or more embodiments, tie features are features that have been photographed in at least two images. In some embodiments, the tie features are selected from the overlapping regions.

In one or more embodiments, a point-to-line based similarity measure incorporates point-to-line tie features for parameter estimation of the transformation function relating the different orthophotos in a subsequent registration. In order to derive such parameter estimation for the transformation function in the subsequent registration, a linear feature which is represented by at least two points are identified in the RGB based orthophoto. In some embodiments, the two points are end points of the linear feature. In at least one embodiment, a user manually identifies the linear feature. In some embodiments, a computer generated algorithm identifies the linear feature. In one or more embodiments, the linear features in the RGB based orthophotos are represented by at least one of: a. a point along a line and a direction vector; b. slope and intercept of the line; or c. magnitude and orientation of a normal to the line from a given origin.

In one or more embodiments, a corresponding linear feature in the partially rectified hyperspectral orthophoto is identified and represented by a sequence of points. In at least one embodiment, a user identifies the corresponding linear feature. In some embodiments, a computer generated algorithm identifies the corresponding linear feature. In various embodiments, tie point-to-line features—in the partially rectified hyperspectral orthophoto and RGB based orthophoto, respectively—are used for the parameter estimation for the transformation function in the subsequent registration.

In one or more embodiments, a point-to-point based similarity measure is used for parameter estimation of the transformation function in a subsequent registration. In various embodiments, salient features are identified in the partially rectified hyperspectral orthophoto from a single or multiple flight lines. Another set of salient features is identified in the RGB based orthophoto as well.

In one embodiment, a user manually identifies corresponding salient features in the partially rectified hyperspectral orthophotos and the RGB based orthophoto. In some embodiments, a computer generated algorithm identifies the salient features in the partially-rectified orthophoto and RGB based orthophoto. The salient feature at a given location considers descriptors such as orientation, scale, and other numerical characteristics that consider the gradient of the grey values in a neighborhood of the salient feature. Assuming a similarity of the corresponding salient features in the partially rectified orthophotos and RGB based orthophoto, the closeness of the respective descriptors for such salient features can be used by computer generated algorithm to identify conjugate ones, which are in turn used for the parameter estimation of the transformation function in the subsequent registration.

In various embodiments, multiple corresponding salient features are identified in multiple partially rectified hyperspectral orthophotos from multiple flight lines. In such embodiments, multiple salient features are first identified in a partially rectified hyperspectral orthophoto of a first flight line. Another set of salient features are identified in a partially rectified hyperspectral orthophoto from another overlapping flight line. Another set of salient features are identified in the RGB based orthophoto as well. The salient feature at a given location considers descriptors such as orientation, scale, and other numerical characteristics that consider the gradient of the grey values in a neighborhood of the salient feature. In some embodiments, a user identifies corresponding salient features in overlapping partially rectified hyperspectral orthophotos and RGB based orthophoto. In some embodiments, a computer generated algorithm identifies corresponding salient features in overlapping partially rectified hyperspectral orthophotos and RGB based orthophoto. In one or more embodiments, multiple salient features and multiple corresponding salient features are identified. Assuming a similarity of the corresponding salient features in the partially rectified orthophotos and RGB based orthophoto, the closeness of the respective descriptors for such salient features can be used to identify conjugate ones, which are in turn used for the parameter estimation for the transformation function in the subsequent registration.

The computer based identification of corresponding salient features in overlapping partially rectified hyperspectral orthophotos uses the location of the salient features together with their scale and orientation to remove outlier correspondences that might arise from repetitive patterns in an agricultural field. The location, scale, and orientation of corresponding salient features should not exhibit significant change within the partially rectified orthophotos. Thus, in various embodiments, the computer based identification of corresponding salient features in overlapping partially rectified hyperspectral orthophotos rejects correspondences that do not share similar location, orientation, and scale.

The computer based identification of corresponding salient features in overlapping partially rectified hyperspectral orthophoto and RGB based orthophoto uses the location of the salient features together with their scale and orientation to remove outlier correspondences that might arise from repetitive patterns in an agricultural field. The location, scale, and orientation of corresponding salient features should not exhibit significant change within the partially rectified orthophotos. Thus, the computer-based identification of corresponding salient features in overlapping partially rectified hyperspectral orthophotos rejects correspondences that do not share similar location, orientation, and scale.

Corresponding salient features in partially rectified hyperspectral orthophotos are used to derive a set of parameters of a simplified transformation—affine transformation—relating the partially rectified hyperspectral orthophotos.

For the registration of the first partially rectified hyperspectral orthophoto, a set of corresponding salient features in that orthophoto is identified in the RGB based orthophoto. Corresponding salient features in the first partially rectified hyperspectral orthophoto and the RGB based orthophoto are used to derive a set of parameters describing the transformation between these orthophotos.

In order to effectively and reliably identify corresponding salient features between the second partially rectified hyperspectral orthophoto and the RGB based orthophoto, the transformation parameters relating the first partially rectified hyperspectral orthophoto and the RGB based orthophoto together with the affine transformation parameters relating the first and second partially rectified hyperspectral orthophotos are combined to derive a better set of transformation between the second partially rectified hyperspectral orthophoto and RGB based orthophoto. Such transformation is obtained by multiplying the affine transformation relating the partially rectified hyperspectral orthophoto of the first flight line and the partially rectified hyperspectral orthophoto of the second flight line with the transformation relating the first partially rectified hyperspectral orthophoto and the RGB based orthophoto. The above procedure is used to enhance the reliability of identified corresponding salient features between subsequent partially rectified hyperspectral orthophoto and the RGB based orthophoto.

Method 100 of processing the image continues with step 120 where the appropriate tie features of the partially rectified hyperspectral orthophoto are registered into the tie features of the RGB based orthophoto. For the point-to-point similarity measure, such registration for each object of the appropriate tie features is performed according to the following equation:

$$\begin{bmatrix} X_{hyper-o}(t) - X_{hyper-o(center)}(t) \\ Y_{hyper-o}(t) - Y_{RGB-o} \end{bmatrix} = \begin{bmatrix} a_0(t) \\ b_0(t) \end{bmatrix} + \begin{bmatrix} a_1(t) \\ b_1(t) \end{bmatrix} [X_{RGB-o}(t) - X_{hyper-o(center)}(t)]$$

where $$\begin{cases} a_0(t) = \delta X_c^m(t) - (\delta X_c^m, \delta Y_c^m, \Delta\omega, \Delta\varphi, \Delta\kappa, \text{ and } \delta\lambda_i)\Delta\varphi(t) \\ b_0(t) = \delta Y_c^m(t) + h\Delta\omega(t) \\ a_1(t) = \frac{\delta\lambda_i(t)}{\lambda_i(t)} + 1 \\ b_1(t) = \Delta\kappa(t) \end{cases}$$

In the above equation, $(X_{hyper-o}(t), Y_{hyper-o}(t))$ indicate coordinates of the object within the tie point which is to be transformed within the partially rectified hyperspectral orthophoto. The coordinates $(X_{RGB-o}, Y_{RGB-o})$ indicate locations of the corresponding tie point in the RGB based orthophoto where the registration of the object based on the above transformation occurs. The functions $a_0(t)$, $b_0(t)$, $a_1(t)$, and $b_1(t)$ are transformation functions which are based upon the relationship between the coordinates of corresponding point-to-point salient features in the partially rectified hyperspectral orthophoto and RGB based orthophoto. The variables $\delta X_c^m$, $\delta Y_c^m$, $\Delta\omega$, $\delta\varphi$, $\Delta\kappa$, and $\delta\lambda_i$ correspond to residual errors in the direct georeferencing information obtained from the GNSS/INS unit. The variable h is the flight height of the aerial unit.

For the point-to-line similarity measure, another registration is performed. For the RGB based orthophoto, which exhibit high geometric fidelity, a linear feature will be represented by two points, which could be the end points of that line. For the corresponding linear feature in the partially rectified hyperspectral orthophoto, it will be represented by a sequence of points. This representation is the only a viable scheme for the linear features in the hyperspectral scene because inaccurate direct geo-referencing would lead to waviness of the linear feature.

For corresponding salient point features in the RGB based orthophoto, the parameters of the transformation function are estimated through a least squares adjustment that minimizes the 2D distance between the coordinates of the salient feature in the RGB based orthophoto and the transformed coordinates of the corresponding salient feature in the partially rectified hyperspectral orthophoto. For corresponding point-to-line salient features in the partially rectified hyperspectral orthophoto and the RGB based orthophoto, the transformation function is first manipulated to produce the form below, which could be also used for salient point-to-point feature correspondences.

$$\begin{bmatrix} X_{RGB-o} - X_{hyper-o(center)}(t) \\ Y_{RGB-o} \end{bmatrix} = \begin{bmatrix} a'_0(t) \\ b'_0(t) \end{bmatrix} + \begin{bmatrix} a'_1(t) & 0 \\ b'_1(t) & 1 \end{bmatrix} \begin{bmatrix} X_{hyper-o}(t) - X_{hyper-o(center)}(t) \\ Y_{hyper-o}(t) \end{bmatrix}$$

where $$a'_0(t) = -\frac{a_0(t)}{a_1(t)}, b'_0(t) = \frac{a_0(t)b_1(t)}{a_1(t)} - b_0(t), a'_1(t) = \frac{1}{a_1(t)}, b'_1(t) = -\frac{b_1(t)}{a_1(t)}$$

For point-to-point correspondences, the utilized weight matrix, which is used in conjunction with the transformation function in the least squares adjustment, is modified to ensure the minimization between the transformed salient feature point in the partially rectified hyperspectral orthophoto and the corresponding line in the RGB based orthophoto through the set of equations below.

$$P_{UV} = R_{XY}^{UV} P_{XY} R_{UV}^{XY}$$

$$P'_{UV} = \begin{bmatrix} 0 & 0 \\ 0 & P_{VV} \end{bmatrix}$$

$$P'_{XY} = R_{UV}^{XY} P'_{UV} R_{XY}^{UV}$$

Where $P_{XY}$ is the original weight matrix for the point-to-point salient feature manipulation $P_{UV}$ is the corresponding weight matrix in a local coordinate system associated with the line feature in the RGB based orthophoto $P'_{UV}$ and $P'_{XY}$ are the modified weight matrices to ensure the minimization of the normal distance between point-to-line features $R_{UV}^{XY}$ and $R_{XY}^{UV}$ are the rotation matrices relating the reference frame of the RGB based orthophoto and the line coordinate system, which is defined along and across the linear feature.

The transformation function relating the partially rectified hyperspectral orthophoto and the RGB based orthophoto—using both point-to-point and point-to-line salient feature correspondences—is based on time-dependent parameters [a'$_0$(i), a'$_1$(i), b'$_0$(i), and b'$_1$(i)] that continually change along the flying trajectory of the platform. Thus, the transformation parameters are estimated for the individual scan lines of the partially rectified hyperspectral orthophoto. In some embodiments, estimating such time-variant transformation parameters might not be necessary and even impossible since: 1) the transformation parameters do not significantly change from one scan to the next due to the smooth nature of the residual errors in the direct georeferencing parameters; and 2) we cannot have sufficient point-to-point and point-to-line feature correspondences for the estimation of such an excessive number of transformation parameters. In order to reduce the number of involved transformation parameters, while considering the smooth nature of residual errors, various embodiments establish select reference points along the trajectory of the partially rectified hyperspectral orthophoto.

The unknown transformation parameters would reduce to those associated with the reference points (i.e., a'$_0$(i), a'$_1$(i), b'$_0$(i), b'$_1$(i)—where i refers to the $i^{th}$ reference point). The transformation parameters at any time t can be derived from those associated with the reference points through a user-defined interpolation polynomial as per the equation below, which gives an example for the a'$_0$(t) parameter.

$$a'_0(t) = \begin{bmatrix} 1 & t & t^2 & \cdots & t^m \end{bmatrix} \cdot M \cdot \begin{bmatrix} a'_0(i) \\ a'_0(i+1) \\ a'_0(i+2) \\ \vdots \\ a'_0(i+n-1) \end{bmatrix}$$

where $$M = (K^T K)^{-1} K^T$$

$$K = \begin{bmatrix} 1 & t_i & t_i^2 & \cdots & t_i^m \\ \vdots & \vdots & \vdots & \ddots & \vdots \\ 1 & t_{i+n-1} & t_{i+n-1}^2 & \cdots & t_{i+n-1}^m \end{bmatrix}$$

t is the corresponding time for the salient point feature in question within the partially rectified hyperspectral orthophoto $t_i$ - - - $t_{i+n-1}^m$ are the times associated with the user defined reference points m is the user-defined order of the interpolation polynomial through the n-neighboring reference points to the salient point feature in question within the partially rectified hyperspectral orthophoto One of ordinary skill in the art would recognize that operations are added or removed from method 100, in one or more embodiments. One of ordinary skill in the art would also recognize that the order of the operations in method 100 is varied in various alternative embodiments.

Figure 2:
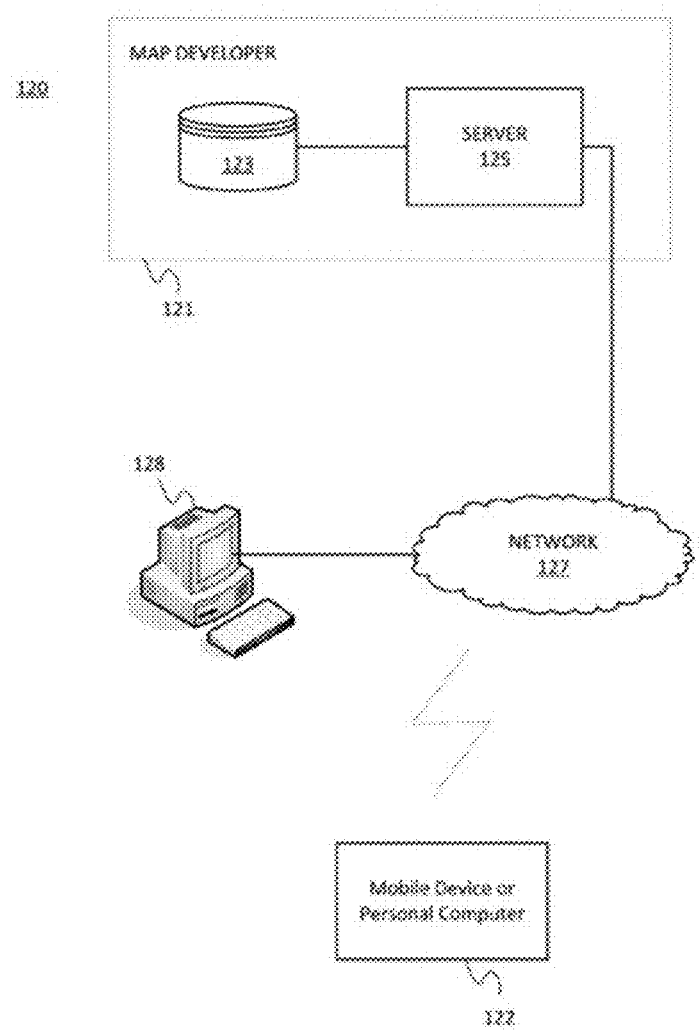
FIG. 2 illustrates an example system of an aerial reconstruction and mapping system.

Refining or reconstructing an aerial image may be performed by a mobile device, personal computer, or workstation and controller and/or server and processor. FIG. 2 illustrates one embodiment of an aerial image refining system 120. The system 120 may include a map developer system 121, a mobile device or personal computer 122, a workstation 128, and a network 127. Additional, different, or fewer components may be provided.

The mobile device or personal computer 122 may be a smart phone, a mobile phone, a personal digital assistant ("PDA"), a tablet computer, a notebook computer, a desktop computer, a personal navigation device ("PND"), a portable navigation device, and/or any other known or later developed mobile device or personal computer.

The developer system 121 includes a server 125 and a database 123. The developer system 121 may include computer systems and networks of a system operator such as HERE, NAVTEQ, or Nokia Corporation. The database 123 is configured to store aerial images provided from an aerial camera or satellite camera, as well as reconstructed orthophoto images processed by the server and algorithm. The server 125 is configured to receive the plurality of aerial images from the aerial camera or satellite camera and analyze/process the images to form a refined or reconstructed orthophoto image. The server 125 may also be configured to store the 3D model and/or the improved orthophoto image generated in the process.

The developer system 121, the workstation 128, and the mobile device or personal computer 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests mobile device 122 to relay current geographic locations. The workstation 128 may be used to enter data indicative of GPS accuracy to the database 123. The workstation 128 may include at least a memory, a processor, and a communication interface.

Figure 3:
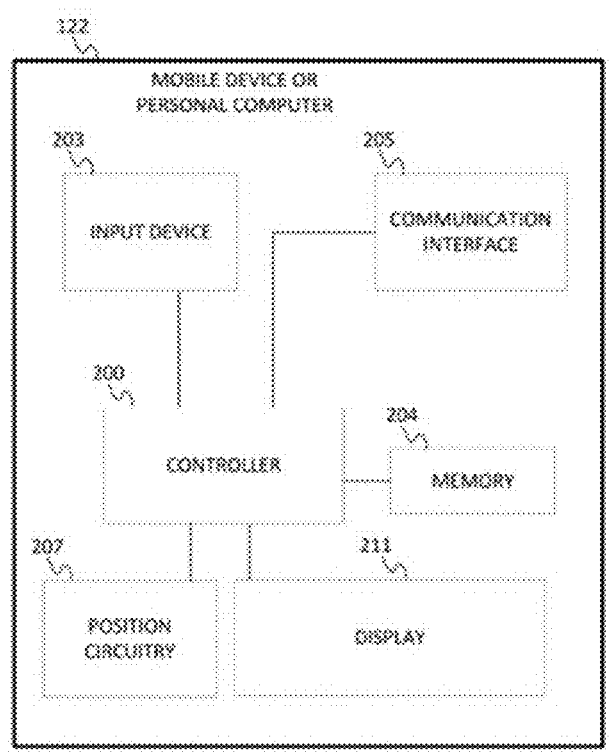
FIG. 3 illustrates an exemplary mobile device of the system of FIG. 2.

FIG. 3 illustrates an exemplary mobile device or personal computer 122 of the system of FIG. 2. The mobile device or personal computer 122 includes a controller 200, a memory 204, an input device 203, a communication interface 205, position circuitry 207, and a display 211. Additional, different, or fewer components are possible for the mobile device/personal computer 122.

The controller 200 may be configured to receive data indicative of the location of the mobile device or personal computer 122 from the position circuitry 207. The positioning circuitry 207, which is an example of a positioning system, is configured to determine a geographic position of the mobile device or personal computer 122. The positioning system may also include a receiver and correlation chip to obtain a GPS signal. The positioning circuitry may include an identifier of a model of the positioning circuitry 207. The controller 200 may access the identifier and query a database or a website to retrieve the accuracy of the positioning circuitry 207 based on the identifier. The positioning circuitry 207 may include a memory or setting indicative of the accuracy of the positioning circuitry.

Figure 4:
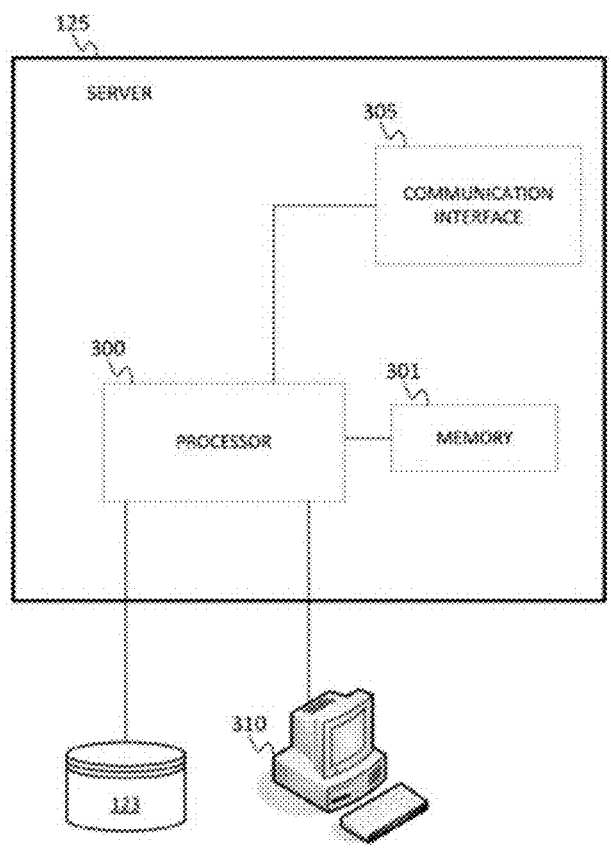
FIG. 4 illustrates an exemplary server of the system of FIG. 2.

FIG. 4 illustrates an exemplary server 125 of the aerial image refining system of FIG. 2. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. The communication interface 305 receives data indicative of use inputs made via the workstation 128 or the mobile device or personal computer 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The controller 200 and/or processor 300 may also be configured to cause an apparatus to at least perform at least one of the aerial image refining methods described above. For example, the controller 200 and/or processor 300 may be configured to perform the process: (1) receive a plurality of aerial images having aerial image data; (2) develop a three-dimensional model from the plurality of aerial images; (3) synthesize a top-down aerial image from the three-dimensional model; and (4) capture the top-down aerial image, forming an improved orthophoto image.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory computer-readable medium encoded with a computer-readable program, which when executed by a processor, will cause a computer to execute a computational method, the computational method comprising:
  collecting an image data, wherein the collecting the image data comprises collecting a first plurality of RGB images and a second plurality of hyperspectral images;
  orthorectifying the image data to produce an RGB based orthophoto and a partially rectified hyperspectral orthophoto;
  selecting tie features from each of the RGB based orthophoto and the partially rectified hyperspectral orthophoto, wherein the selecting the tie features comprises using a point-to-line based similarity measure; and
  registering the tie features of the partially rectified hyperspectral orthophoto into the tie features of the RGB based orthophoto.

2. The method of claim 1, wherein the using the point-to-line bases similarity measure comprises:
  identifying a linear feature in the RGB based orthophoto, wherein the linear feature is represented by at least two points;
  identifying a corresponding linear feature in the partially rectified hyperspectral orthophoto, wherein the corresponding linear feature is represented by a sequence of points; and
  calculating a parameter estimation of a tie feature in the RGB based orthophoto and the partially rectified hyperspectral orthophoto for a transformation function.

3. The method of claim 2, wherein the at least two points are end points of the linear feature.

4. The method of claim 2, wherein the linear feature is represented by at least one of a point along a line and a direction vector of the linear feature, a slope and an intercept of the linear feature, or a magnitude and an orientation of a normal to the linear feature from a given origin.

5. The method of claim 1, further comprising calculating parameters of a transformation function for a set of tie features through a least squares adjustment method.

6. The method of claim 1, wherein the registering the tie features of the partially rectified hyperspectral orthophoto into the tie features of the RGB based orthophoto comprises:
  registering each object within the tie feature of the partially rectified hyperspectral orthophoto into the tie feature of the RGB based orthophoto using a transformation function, wherein the transformation function comprises:

$$\begin{bmatrix} X_{RGB-o} - X_{hyper-o(center)}(t) \\ Y_{RGB-o} \end{bmatrix} = \begin{bmatrix} a'_0(t) \\ b'_0(t) \end{bmatrix} + \begin{bmatrix} a'_1(t) & 0 \\ b'_1(t) & 1 \end{bmatrix} \begin{bmatrix} X_{hyper-o}(t) - X_{hyper-o(center)}(t) \\ Y_{hyper-o}(t) \end{bmatrix}$$

7. The method of claim 6, wherein each of the $a'_0(t)$, $a'_1(t)$, $b'_0(t)$, and $b'_1(t)$ are derived using reference points in the partially rectified hyperspectral orthophoto through a user defied interpolation polynomial.

8. The method of claim 1, wherein a tie feature of the tie features of the partially rectified hyperspectral orhophoto and a tie feature of the tie features of the RGB based orthophoto are corresponding tie features.

9. A non-transitory computer-readable medium encoded with a computer-readable program, which when executed by a processor, will cause a computer to execute a computational method, the computational method comprising:
  collecting an image data, wherein the collecting the image data comprises collecting a first plurality of RGB images and a second plurality of hyperspectral images;
  orthorectifying the image data to produce an RGB based orthophoto and a partially rectified hyperspectral orthophoto;
  selecting tie features from each of the RGB based orthophoto and the partially rectified hyperspectral orthophoto, wherein the selecting the tie features comprises using a point-to-point based similarity measure; and
  registering the tie features of the partially rectified hyperspectral orthophoto into the tie features of the RGB based orthophoto.

10. The method of claim 9, wherein the using the point-to-point based similarity measure comprises:
  identifying a first plurality of salient features in the partially rectified hyperspectral orthophoto;
  identifying a second plurality of salient features in the RGB based orthophoto;
  identifying conjugate features for the partially rectified hyperspectral orthophoto and the RGB based orthophoto from the first plurality of salient features and the second plurality of salient features; and
  calculating a parameter estimation of the conjugate features for a transformation function, wherein a set of the conjugate features are the tie features.

11. The method of claim 10, wherein the calculating the parameter estimation comprises calculating the parameter estimation through a least squares adjustment.

12. The method of claim 10, wherein the identifying the conjugate features for the partially rectified hyperspectral orthophoto and the RGB based orthophoto from the first plurality of salient features and the second plurality of salient features comprises:
  assessing similarity between a salient feature of the partially rectified hyperspectral orthophoto and a salient feature of the RGB based orthophoto based on location and a set of descriptors.

13. The method of claim 12, wherein the set of descriptors comprises orientation, scale, and a set of numerical characteristics that consider a gradient of grey values in a neighborhood of the salient feature.

14. The method of claim 9, wherein the registering the tie features of the partially rectified hyperspectral orthophoto into the tie features of the RGB based orthophoto comprises:
  registering each object within the tie feature of the partially rectified hyperspectral orthophoto into the tie feature of the RGB based orthophoto using a transformation function, wherein the transformation function comprises:

$$\begin{bmatrix} X_{hyper-o}(t) - X_{hyper-o(center)}(t) \\ Y_{hyper-o}(t) - Y_{RGB-o} \end{bmatrix} = \begin{bmatrix} a_0(t) \\ b_0(t) \end{bmatrix} +$$

-continued $$\begin{bmatrix} a_1(t) \\ b_1(t) \end{bmatrix} [X_{RGB-o}(t) - X_{hyper-o(center)}(t)]$$

15. The method of claim 9, wherein the registering the tie features of the partially rectified hyperspectral orthophoto into the tie features of the RGB based orthophoto comprises:
   registering each object within the tie feature of the partially rectified hyperspectral orthophoto into the tie feature of the RGB based orthophoto using a weight matrix in conjunction with a transformation function in a least squares adjustment.

16. The method of claim 9, wherein the registering the tie features of the partially rectified hyperspectral orthophoto into the tie features of the RGB based orthophoto comprises:
   registering each object within the tie feature of the partially rectified hyperspectral orthophoto into the tie feature of the RGB based orthophoto using a transformation function, wherein the transformation function comprises:

$$\begin{bmatrix} X_{RGB-o} - X_{hyper-o(center)}(t) \\ Y_{RGB-o} \end{bmatrix} = \begin{bmatrix} a'_0(t) \\ b'_0(t) \end{bmatrix} +$$

$$\begin{bmatrix} a'_1(t) & 0 \\ b'_1(t) & 1 \end{bmatrix} \begin{bmatrix} X_{hyper-o}(t) - X_{hyper-o(center)}(t) \\ Y_{hyper-o}(t) \end{bmatrix}$$

17. The method of claim 16, wherein each of the a'$_0$a'$_1$(t), b'$_0$(t), and b'$_1$(t) are derived using reference points in the partially rectified hyperspectral orthophoto through a user defied interpolation polynomial.

18. The method of claim 9, wherein the orthorectifying the image data to produce the partially rectified hyperspectral orthophoto comprises:
   identifying corresponding salient features between at least two images of the image data; and
   deriving a set of parameters of an affine transformation using the identified corresponding salient features.

19. The method of claim 18, wherein the selecting tie features from each of the RGB based orthophoto and the partially rectified hyperspectral orthophoto comprises:
   identifying second corresponding salient features between a first rectified hyperspectral orthophoto and the RGB based orthophoto;
   deriving a set of parameters describing a transformation between the first rectified hyperspectral orthophoto and the RGB based orthophoto using the identified second corresponding salient features;
   combining the set of parameters of the affine transformation with the set of parameters describing the transformation between the first rectified hyperspectral orthophoto and the RGB based orthophoto to derive a second set of transformation; and
   identifying further corresponding salient features between a second rectified hyperspectral orthophoto the RGB based orthophoto using the second set of transformation.

20. A non-transitory computer-readable medium encoded with a computer-readable program, which when executed by a processor, will cause a computer to execute a computational method, the computational method comprising:
   collecting an image data, wherein the collecting the image data comprises collecting a first plurality of RGB images and a second plurality of hyperspectral images;
   orthorectifying the image data to produce an RGB based orthophoto and a partially rectified hyperspectral orthophoto;
   selecting tie features from each of the RGB based orthophoto and the partially rectified hyperspectral orthophoto; and
   registering each object within the tie feature of the partially rectified hyperspectral orthophoto into the tie feature of the RGB based orthophoto using a transformation function.

21. The method of claim 20, wherein the orthorectifying the image data to produce the partially rectified hyperspectral orthophoto comprises:
   identifying corresponding salient features between at least two images of the image data; and
   deriving a set of parameters of an affine transformation using the identified corresponding salient features.

22. The method of claim 21, wherein the selecting tie features from each of the RGB based orthophoto and the partially rectified hyperspectral orthophoto comprises:
   identifying second corresponding salient features between a first rectified hyperspectral orthophoto and the RGB based orthophoto;
   deriving a set of parameters describing a transformation between the first rectified hyperspectral orthophoto and the RGB based orthophoto using the identified second corresponding salient features;
   combining the set of parameters of the affine transformation with the set of parameters describing the transformation between the first rectified hyperspectral orthophoto and the RGB based orthophoto to derive a second set of transformation; and
   identifying further corresponding salient features between a second rectified hyperspectral orthophoto the RGB based orthophoto using the second set of transformation.

* * * * *